(12) United States Patent
Whang

(10) Patent No.: US 7,127,341 B2
(45) Date of Patent: Oct. 24, 2006

(54) FAILSAFE STEERING DEVICE FOR STEER-BY-WIRE SYSTEM

(75) Inventor: Juhn-Sub Whang, Namyangju-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 167 days.

(21) Appl. No.: 10/975,334

(22) Filed: Oct. 29, 2004

(65) Prior Publication Data
US 2005/0283291 A1  Dec. 22, 2005

(30) Foreign Application Priority Data
Jun. 22, 2004  (KR) ............... 10-2004-0046736

(51) Int. Cl.
*B62D 5/04* (2006.01)
(52) U.S. Cl. ............... 701/43; 701/33; 180/322
(58) Field of Classification Search ............... 180/322
See application file for complete search history.

(56) References Cited

U.S. PATENT DOCUMENTS 4,911,261 A * 3/1990 Conley ............... 180/322
6,535,806 B1 * 3/2003 Millsap et al. ............... 701/42
6,580,989 B1 * 6/2003 Husain et al. ............... 701/41
7,004,279 B1 * 2/2006 Shitamitsu et al. ......... 180/402
2004/0193344 A1 * 9/2004 Suzuki ............... 701/41

* cited by examiner

Primary Examiner—Michael J. Zanelli
(74) Attorney, Agent, or Firm—Greenblum & Bernstein, P.L.C.

(57) ABSTRACT

A failsafe steering device for a steer-by-wire system includes a main Electronic Control Unit (ECU) that detects manipulating states of a main steering wheel and a rack mechanism via a plurality of sensors, actuates a reaction motor that provides the reaction force to the main steering wheel in relation to a driver's steering force, and controls a steering motor that executes the steering by actuating the rack mechanism. The failsafe steering device further includes a battery providing power to the steering motor, a relay restraining the power supply between the battery and the steering motor, a failsafe ECU that determines the malfunction state of the main ECU and controls the relay accordingly, and a steering shaft that transmits the rotational force of a supplement steering wheel to the rack mechanism.

4 Claims, 2 Drawing Sheets

FAILSAFE STEERING DEVICE FOR STEER-BY-WIRE SYSTEM

CROSS-REFERENCE TO RELATED APPLICATIONS

The present application is based on, and claims priority from, Korean Application Serial Number 10-2004-0046736, filed on Jun. 22, 2004, the disclosure of which is hereby incorporated by reference herein in its entirety.

FIELD OF THE INVENTION

The present invention relates to a failsafe steering device for a steer-by-wire system. More particularly, the present invention relates to a device adapted to safely steer the vehicle in case the steer-by-wire system malfunctions.

BACKGROUND OF THE INVENTION

Generally, a steer-by-wire system actuates a rack mechanism to steer the vehicle in response to a driver's steering manipulation via electric signals without a steering column.

Test vehicles (used for developing vehicles) having the steer-by-wire system are typically equipped with a failsafe steering device to help ensure the safety of the steer-by-wire system.

If the steer-by-wire system fails to function properly, the steering can be performed safely in the test vehicles via the failsafe steering device.

A mechanical failsafe steering device is conventionally used to transmit the rotational force of a supplement steering wheel to the rack mechanism through a steering shaft.

SUMMARY OF THE INVENTION

Embodiments of the present invention are provided to easily steer a test vehicle even when a steer-by-wire system of the test vehicle malfunctions, thereby improving the safety of the test vehicle.

A failsafe steering device for a steer-by-wire system includes a main Electronic Control Unit (ECU) that detects manipulation states of a main steering wheel and rack mechanism via a plurality of sensors. The main ECU actuates a reaction motor that provides reaction force to the main steering wheel in relation to the driver's steering force and controls a steering motor that executes the steering by actuating the rack mechanism. A battery provides power to the steering motor. A relay restrains the power supply between the battery and steering motor. A failsafe ECU determines whether the main ECU malfunctions and controls the relay accordingly. A steering shaft transmits the rotational force of a supplement steering wheel to the rack mechanism.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
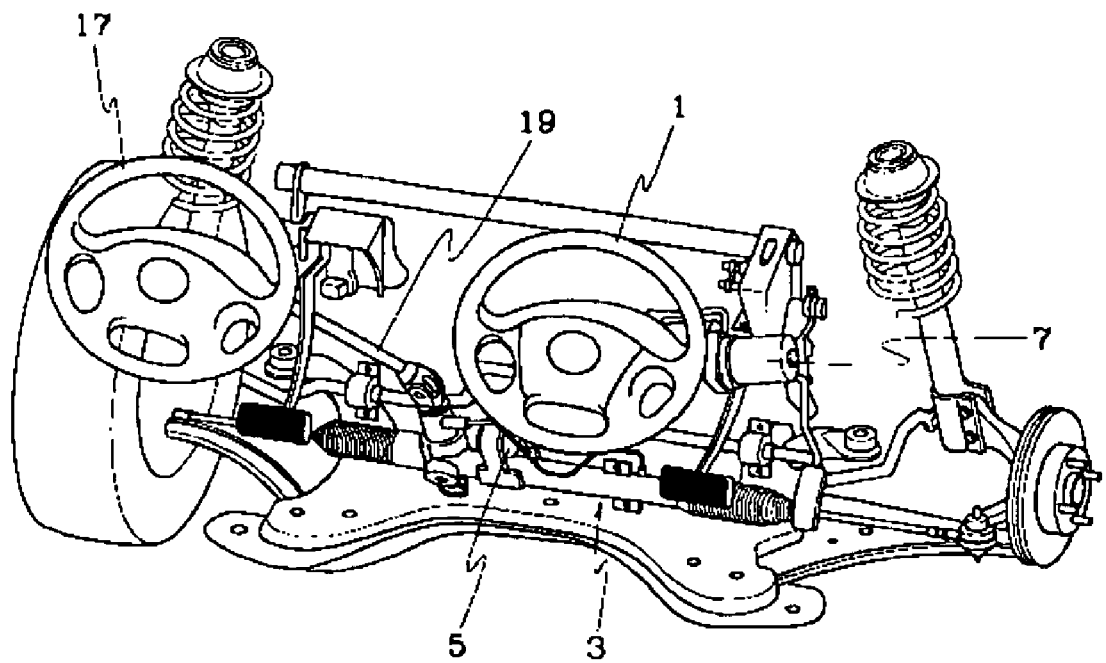
FIG. 1 is a perspective view of a steering mechanism adopted with a failsafe steering device for a steer-by-wire system according to an embodiment of the present invention.
Figure 2:
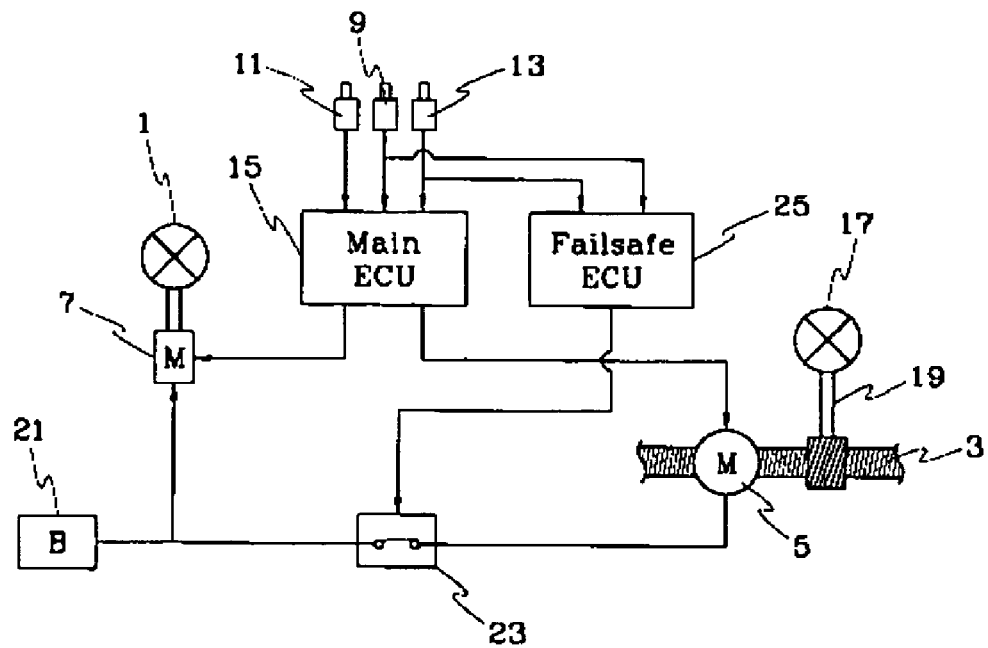
FIG. 2 is a block diagram illustrating the configuration of the present invention.

Referring first to FIGS. 1 and 2, a main steering wheel 1 is installed to be manipulated by a driver. A rack mechanism 3, constituted by a rack and pinion, manipulates a steering knuckle. A steering motor 5 is installed on the rack mechanism 3 and activated according to the rotational state of the main steering wheel 1 for steering purposes. A reaction motor 7 provides the reaction force to the main steering wheel 1.

A steering angle sensor 9 and torque sensor 11 detect the manipulated state of the main steering wheel 1. A rack sensor 13 detects the operation state of the rack mechanism 3. A main Electronic Control Unit (ECU) 15 receives signals from the steering angle sensor 9, torque sensor 11, and rack sensor 13 and controls the steering motor 5 and reaction motor 7.

A supplement steering wheel 17 is located in front of a front passenger for assisting the main steering wheel 1. The rotational force of the supplement steering wheel 17 is directly transmitted to the rack mechanism 3 through a steering shaft 19 in a mechanical manner.

The main steering wheel 1 and rack mechanism 3 are connected electronically while the supplement steering wheel 17 and rack mechanism 3 are mechanically connected to each other.

If the main ECU 15 operating the rack mechanism 3 in response to the steering state of the main steering wheel 1 malfunctions or improper steering is executed due to a failure or damage on other electric devices, then the steering of a test vehicle may manually be manipulated via the supplement steering wheel 17.

A battery 21 provides power to the steering motor 5 and reaction motor 7. A relay 23 restrains the power supply between the battery 21 and steering motor 5. The relay 23 is controlled by a failsafe ECU 25 that determines whether the main ECU 15 is in a malfunction state.

Accordingly, even in case the main ECU 15 sends a signal to drive the steering motor 5, if the failsafe ECU 25 manipulates the relay 23 to cut off power delivered from the battery 21 to the steering motor 5, the steering motor 5 does not generate torque.

The main ECU 15 receives signals from the steering angle sensor 9, torque sensor 11 and rack sensor 13. The steering angle sensor 9 measures the steering angle of the main steering wheel 1, the torque sensor 11 detects the steering torque of the main steering wheel 1, and the rack sensor 13 detects the operational state of the rack mechanism 3. By comparing the signals of the steering angle sensor 9 and rack sensor 13, the main ECU 15 determines at all times whether the rack mechanism 3 operates according to the driver's manipulation of the main steering wheel 1. The main ECU 15 also measures via the torque sensor 11 a torque generated by the reaction force (provided to the reaction motor 7) and rotational force (provided by the driver's manipulation) to thereby feedback control the reaction motor 7.

The failsafe ECU 25, just like the main ECU 15, receives signals from the steering angle sensor 9 and rack sensor 13 and compares the signals to monitor in real time whether the main ECU 15 properly performs the control operation.

Figure 3:
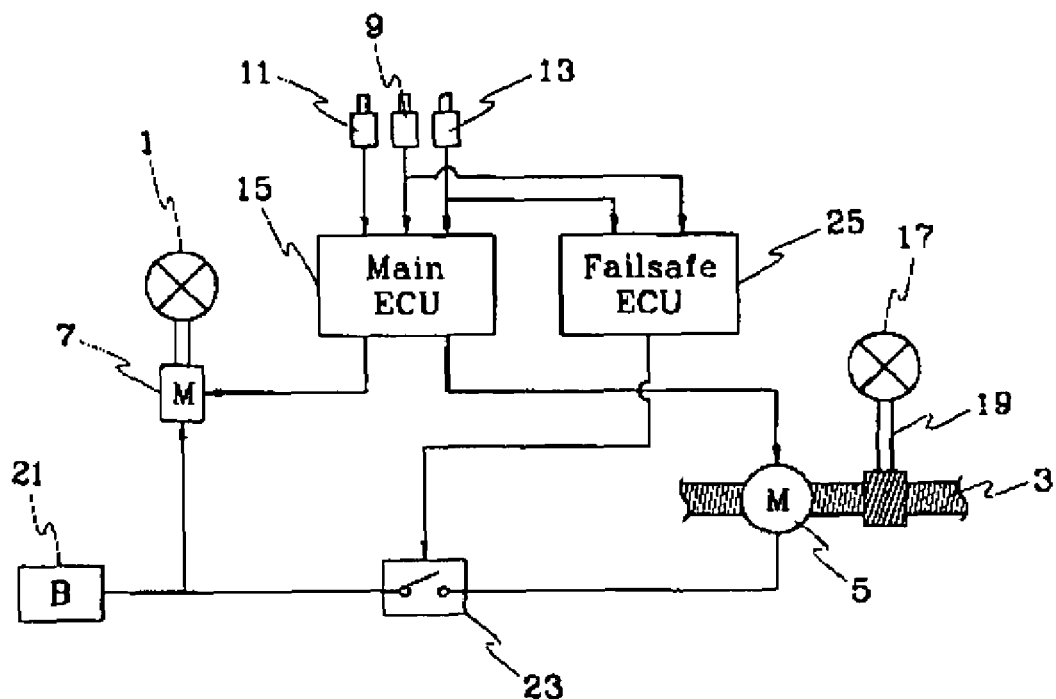
FIG. 3 depicts the operation state of a steering mechanism compared to FIG. 2.

Provided that the manipulation of the main steering wheel 1 is improperly applied to the rack mechanism 3 due to a malfunction of the main ECU 15, then the failsafe ECU 25 detects the malfunction state and controls the relay 23 as shown in FIG. 3, thereby preventing power supply from the battery 21 to the steering motor 5.

Therefore, the steering motor 5 prevents generation of an erroneous torque, and the front passenger manipulates the supplement steering wheel 17 in abnormal conditions of the main ECU 15, thereby ensuring the safe steering of the test vehicle.

As the erroneous torque of the steering motor 5 is not applied to the rack mechanism 3, the supplement steering wheel 17 can easily and appropriately be manipulated.

Figure 4:
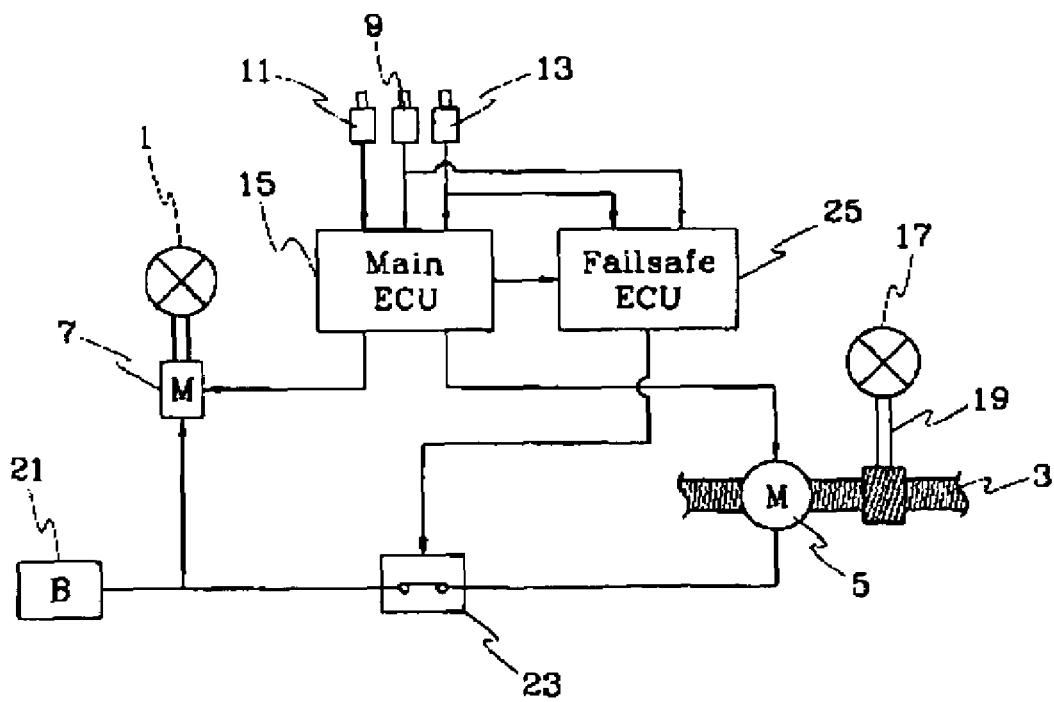
FIG. 4 illustrates another embodiment of the present invention.

Another embodiment of the present invention shown in FIG. 4 is identical in configuration to the above embodiment of FIGS. 2 and 3. However, these embodiments are different since the failsafe ECU 25 may receive the malfunction signal that the main ECU 15 generates by itself.

The failsafe ECU 25 determines whether the main ECU 15 malfunctions by receiving the signals from the steering angle sensor 9 and rack sensor 13 or by receiving a malfunction signal that the main ECU 15 generates by itself in the second embodiment of the present invention. Once it is determined that the main ECU 15 is improperly operating, the failsafe ECU 25 controls power provided to the steering motor 5 by manipulating the relay 23.

As apparent from the foregoing, there is an advantage in that test vehicles are easily and properly steered even when the steer-by-wire system malfunctions, resulting in an improvement of the safety of the test vehicles.

What is claimed is:

1. A failsafe steering device for a steer-by-wire system, the device comprising:

a main Electronic Control Unit (ECU) that detects manipulating states of a main steering wheel and a rack mechanism via a plurality of sensors, actuates a reaction motor that provides the reaction force to said main steering wheel in relation to a driver's steering force, and controls a steering motor that executes the steering by actuating said rack mechanism;

a battery providing power to said steering motor;

a relay restraining the power supply between said battery and said steering motor;

a failsafe ECU that determines the malfunction state of said main ECU and controls said relay accordingly; and a steering shaft that transmits the rotational force of a supplement steering wheel to said rack mechanism.

2. The device as defined in claim 1, wherein said plurality of sensors sending signals to said main ECU comprises:

a steering angle sensor that measures the steering angle of said main steering wheel;

a torque sensor that detects the steering torque of said main steering wheel; and a rack sensor that detects the operation state of said rack mechanism.

3. The device as defined in claim 2, wherein said failsafe ECU receives signals from said steering angle sensor and said rack sensor and determines whether said main ECU is in a malfunction state.

4. The device as defined in claim 3, wherein said failsafe ECU determines that said main ECU malfunctions by receiving a malfunction signal generated from said main ECU, and manipulates said relay to cut off power supplied to said steering motor.

* * * * *